(12) United States Patent
Everhart

(10) Patent No.: US 6,230,138 B1
(45) Date of Patent: May 8, 2001

(54) METHOD AND APPARATUS FOR CONTROLLING MULTIPLE SPEECH ENGINES IN AN IN-VEHICLE SPEECH RECOGNITION SYSTEM

(75) Inventor: Charles Allen Everhart, Canton, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/605,253

(22) Filed: Jun. 28, 2000

(51) Int. Cl.[7] ............................ G10L 11/00; G10L 15/20; B01H 21/84; G05B 5/00
(52) U.S. Cl. .................... 704/275; 704/270; 704/231; D12/415; D12/421; 454/74
(58) Field of Search ..................................... 704/500, 231, 704/272, 270, 271, 275

Primary Examiner—Tālivaldis I. Šmits
Assistant Examiner—Daniel A Nolan
(74) Attorney, Agent, or Firm—Quarles & Brady LLP

(57) ABSTRACT

Disclosed herein is a method and apparatus for controlling a speech recognition system on board an automobile. The automobile has one or more voice activated accessories and a passenger cabin with a number of seating locations. The speech recognition system has a plurality of microphones and push-to-talk controls corresponding to the seating locations for inputting speech commands and location identifying signals, respectively. The speech recognition system also includes multiple speech engines recognizing speech commands for operating the voice activated accessories. A selector is coupled to the speech engines and push-to-talk controls for selecting the speech engine best suited for the current speaking location. A speech processor coupled to the speech engine selector is used to recognize the speech commands and transmit the commands to the voice activated accessory.

19 Claims, 4 Drawing Sheets

METHOD AND APPARATUS FOR CONTROLLING MULTIPLE SPEECH ENGINES IN AN IN-VEHICLE SPEECH RECOGNITION SYSTEM

BACKGROUND OF THE INVENTION

This invention relates generally to the field of speech recognition systems. In particular, this invention relates to in-vehicle speech recognition systems for controlling vehicle accessories.

Speech recognition systems on board automobiles permit drivers and passengers to control various vehicle functions by uttering voice commands. One or more microphones placed throughout the cabin and coupled to a speech processor receive the voice commands. The speech processor processes the uttered voice commands using various acoustic and language modeling techniques to correspond the uttered voice commands to known commands contained in one or more command grammar sets.

A major problem of existing speech recognition systems is accurately recognizing utterances of multiple speakers. This problem is especially prevalent in speech recognition systems used on board vehicles where multiple occupants, such as the driver, front passengers and rear passengers, issue voice commands. Thus, in-vehicle speech recognition system must be able to process audio signals corresponding to spoken commands issued from various locations within the cabin, both in the front and back seats. In many vehicles, particularly large automobiles, trucks and vans, the acoustic characteristics of the various seating locations can vary with the effects of traffic, window position and audio system sound. This variation in acoustic characteristics can have a noticeably adverse affect on the accuracy of the speech recognition system. Moreover, while simply placing a microphone proximate each seat may help improve overall recognition accuracy, it does not accommodate for the variation in acoustic characteristics at each seat.

Another problem specific to speech recognition systems in automobiles is selectively determining the vehicle functions that may be voice activated by various occupants of the vehicle. For example, in an automobile equipped with one or more voice activated rearview mirrors, permitting passengers to operate the mirror may be disadvantageous. As other examples, it may be desired that a rear seat passenger be prevented from operating a front window, or that a child passenger operate any window controls at all.

Accordingly, an improved in-vehicle speech recognition system is needed that can better recognize speech commands at various cabin locations as well as control which automobile accessories can be voice operated at these locations.

BRIEF SUMMARY OF THE INVENTION

The present invention provides an in-vehicle speech recognition system capable of accurately recognizing speech from vehicle occupants at different cabin locations. The system of the present invention includes multiple speech engines having different recognition characteristics and/or active grammar sets. This allows the system of the present invention to accommodate different acoustic characteristics of various cabin locations and make available different voice operable accessories and accessory-functions at each cabin location.

In one aspect of the invention, a speech recognition system is provided in an automobile having at least one voice activated accessory and a passenger cabin with a plurality of speaking locations. The system includes a plurality of microphones and push-to-talk controls mounted within the passenger cabin so as to correspond to each of the speaking locations. Each of the push-to-talk controls supply a location signal when operated and each of the microphones can receive a spoken utterance from a speaker and provide a corresponding audio signal. A plurality of speech engines, each having different recognition parameters, recognize the audio signal as a speech command for controlling the relevant voice activated accessory. A selector is coupled to the push-to-talk controls, microphones and speech engines. The selector selects one of the speech engines according to the location signal it receives and provides the corresponding audio signal to the selected speech engine.

In another aspect, the selector may be coupled to the push-to-talk controls via a vehicle network in which case the selector processes the location signal to determine which speech processor to select. Alternatively, the selector may have separate inputs for each push-to-talk control. In this case, each input can be directly coupled to a particular speech engine.

In yet another aspect, the selector provides a selection signal to the selected speech engine. Further, one or more of the speech engines can contain multiple grammar sets, each containing different sets of voice commands. In this case, the selector will select an active grammar from the multiple grammar sets according to the location signal. Moreover, the selection signal sent to the selected speech engine will indicate which grammar set is to be the active grammar set.

In still another aspect, the multiple speech engines have different acoustic modeling parameters for processing audio signals corresponding to spoken utterances originating at speaking locations with differing acoustic characteristics and/or microphone placement.

In another aspect, the selector and speech engines are included in a central control unit having a memory for storing voice commands.

Thus, the present invention provides the advantages of an in-vehicle speech recognition system that can accurately recognize voice commands from automobile occupants seated at various cabin locations by providing multiple speech processors each tuned to recognized speech signals originating from locations having different acoustical qualities. Moreover, the present invention provides the additional advantage of selectively controlling what accessories and accessory functions can be controlled at each cabin location.

These and other advantages of the present invention will be apparent from the description of the preferred embodiments, which follow.

DETAILED DESCRIPTION OF THE PREFERRED EMBODIMENTS

Figure 1:
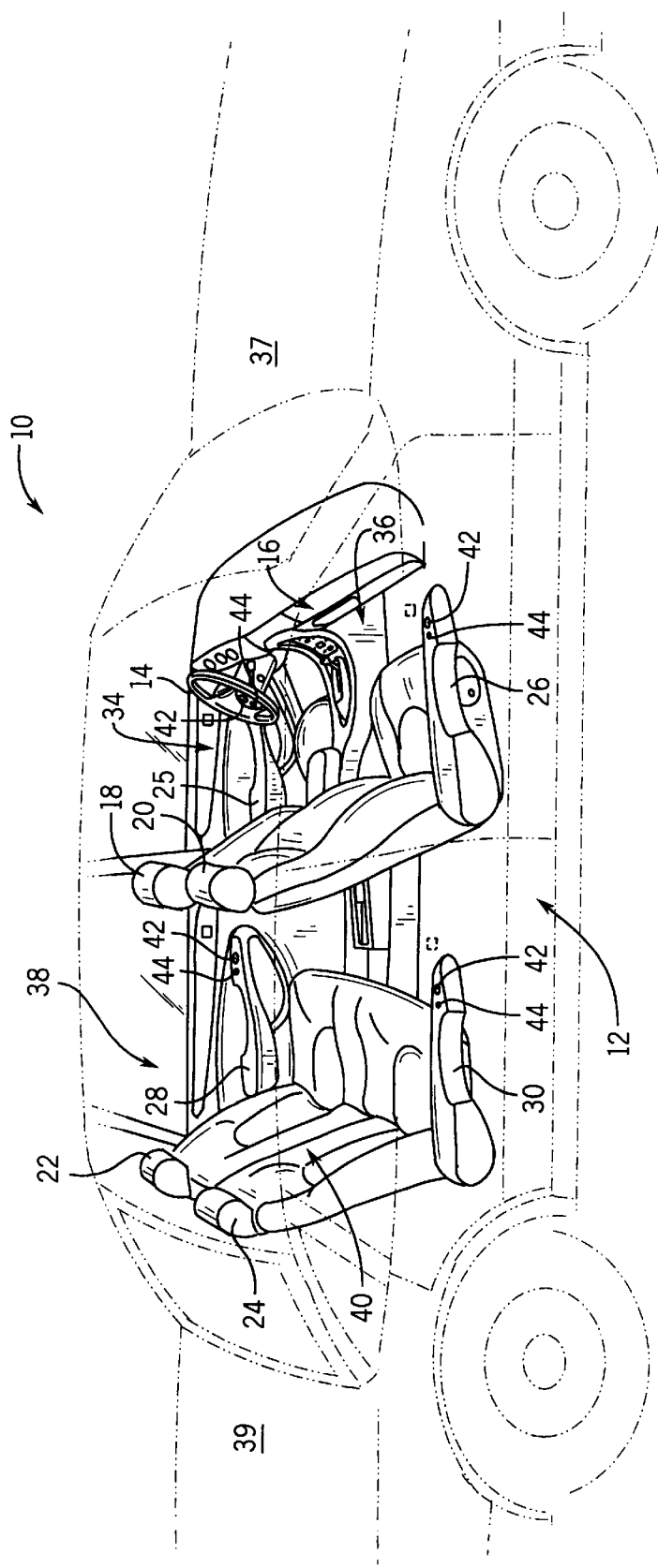
FIG. 1 is a perspective view of an automobile passenger cabin in which the speech recognition system and method of the present invention can be used.
Figure 2:
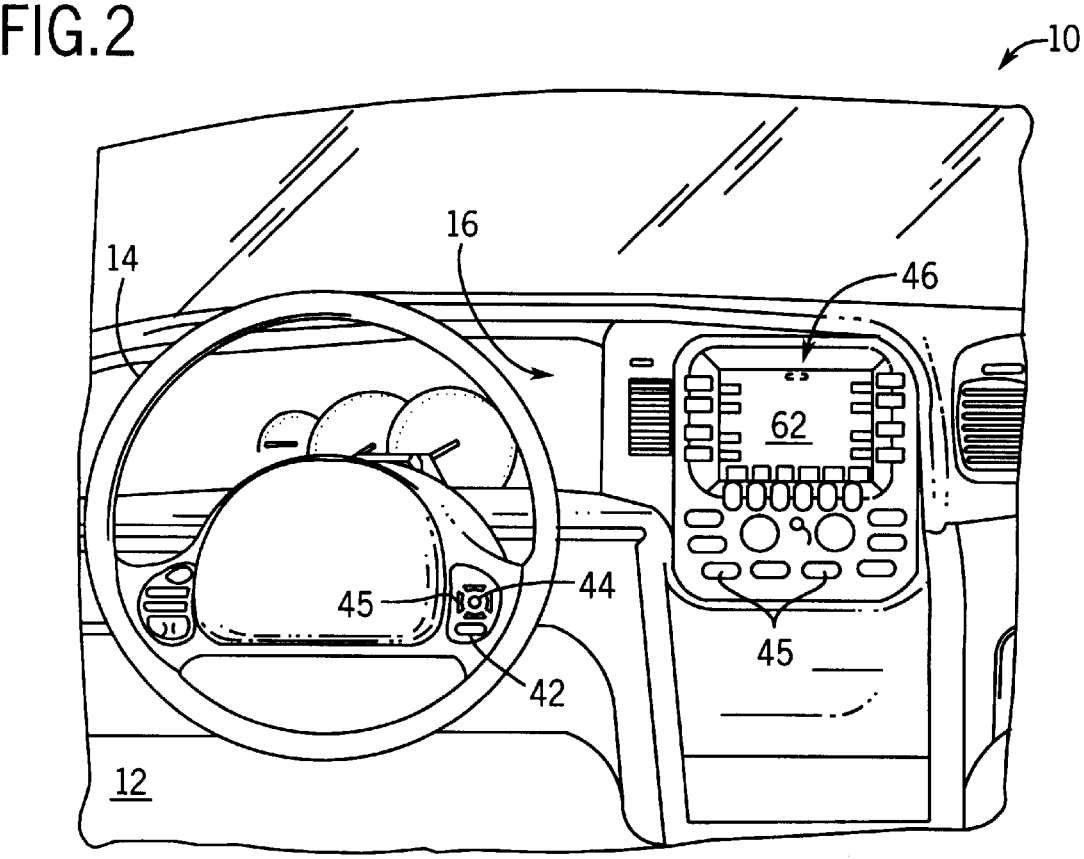
FIG. 2 is a partial front view of an instrument panel of the automobile of FIG. 1 having a central control unit.

Referring to FIGS. 1 and 2, an automobile 10 includes a passenger cabin 12 having a steering wheel 14, an instrument panel/dashboard 16, driver seat 18, front 20 and rear passenger seats 22, 24 and driver 25, front passenger 26 and rear passenger 28, 30 arm rests. The driver 18 and front 20 and rear passenger seats 22, 24 define a driver speaking location 34 and a three passenger speaking locations 36, 38, 40, respectively. Locations other than the seats, such as under the hood 37 or in the trunk 39, may also define speaking locations as well. A microphone 42 and push-to-talk (PTT) control 44 are mounted proximate each speaking location. The microphones 42 and PTT controls 44 can be positioned apart or in close proximity to each other and mounted to any suitable part of the automobile 10 provided the PTT controls 44 are easily operated by hand and the microphones can pick up speech signals from a speaker seated in one of the speaking locations. Preferably, a microphone 42 and a push-to-talk control 44 are mounted to the steering wheel 14 as well as to each of the front 26 and rear 28, 30 passenger arm rests. Rather than being mounted to the steering wheel 14, the driver's microphone 42 and PTT control 44 could be mounted to the driver arm rest 25.

Figure 3:
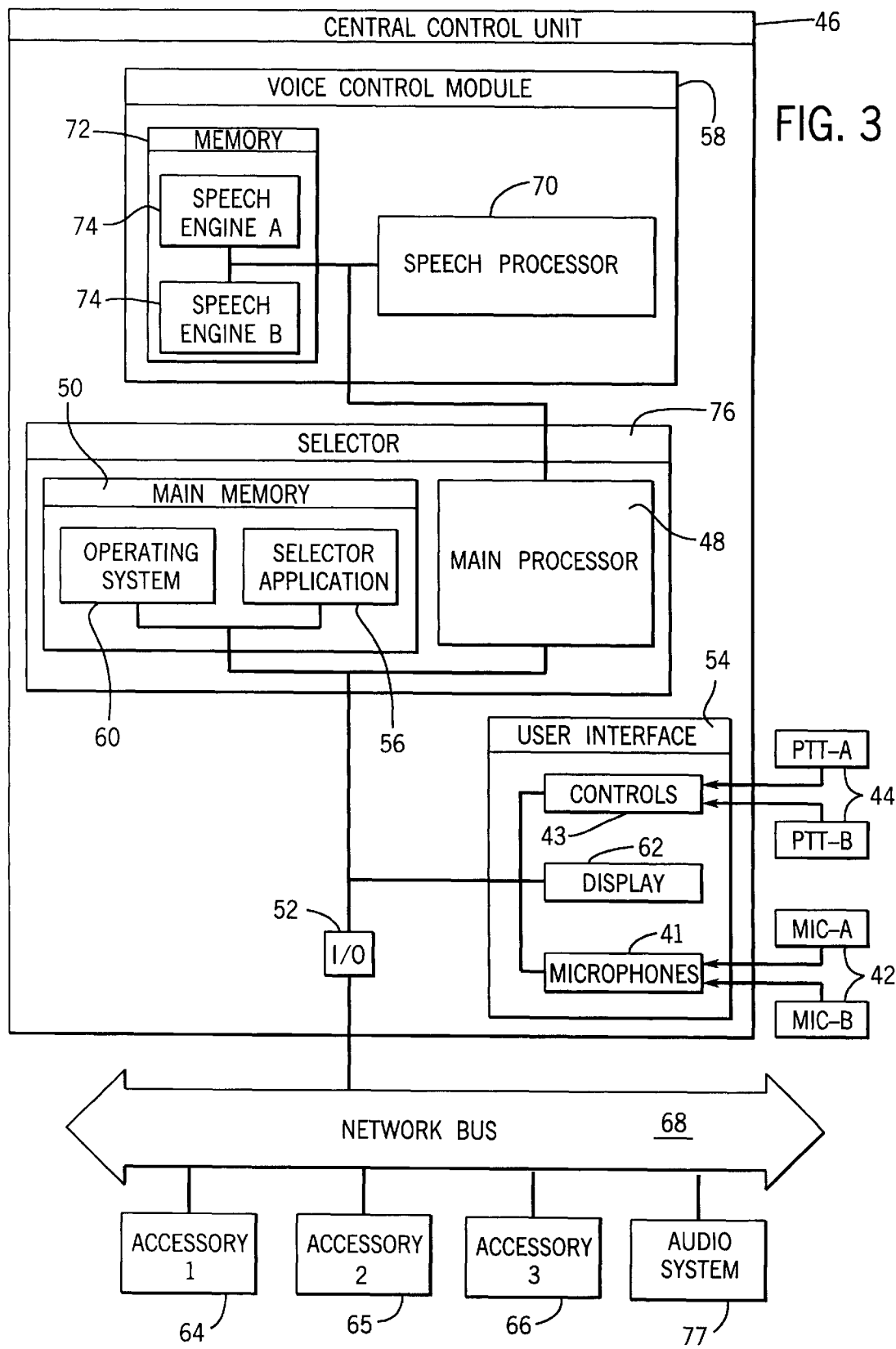
FIG. 3 is a block diagram of the central control unit of FIG. 2 having a voice control module providing the speech recognition system of the present invention.

Referring to FIGS. 2 and 3, the instrument panel 16 preferably includes a central control unit 46 having a main processor 48, main memory 50, an input/output (I/O) module 52, a user interface 54 and a voice control system (VCS) module 58. The main processor 48 can be any suitable known microprocessor and the main memory 50 can be any suitable known electronic storage device. The central control unit 46 is preferably in a suitable location for operation by a driver and front passenger (not shown). The main memory 50 includes programming providing an operating system 60 for controlling operation of the main processor 48 and processes of the other components of the central control unit 46 and a selector application program 56 as will be described.

The user interface 54 preferably includes a display 62 (which may provide audio or visual output) and is coupled to the microphones 42 via a microphone interface 41 and the PTT controls 44 and other controls 45 via a control interface 43. FIG. 3 shows the user interface 54 coupled to two microphones (MIC-A and MIC-B) and two PTT controls (PTT-A and PTT-B), however, any number may be used. The I/O module 52 is coupled to vehicle accessories, such as the three accessories 64, 65 and 66, via a vehicle network bus 68. The I/O module 52 allows the communication of data to the vehicle accessories to permit adjustment of all controllable function parameters associated with each accessory. The vehicle accessories can be any powered devices, such as a climate control, a clock, interior or exterior lights, the audio system, rear view mirrors, door locks, seat and window controls and a navigation system.

The VCS module 58 includes a speech processor 70 and a memory 72. The speech processor 70 can be any suitable known microprocessor and the memory 72 can be any suitable known electronic storage device. It should be noted that although FIG. 3 shows the user 54 interface and the VCS module 58 as being a part of the central control unit 46, these components could all be separate devices coupled directly or via the vehicle network bus 68. Stored within the VCS memory 72 is software programming providing multiple, unique speech engines 74 suitable for performing the method of the present invention. FIG. 3 shows two speech engines (Speech Engine-A and Speech Engine-B), which is the minimum required for practicing the present invention. However, it should be noted that any number of additional speech engines may also be included. Preferably, the number of speech engines corresponds to the number of speaking locations (i.e., microphone and PTT control sets), however, there may be more or less. Each speech engine 74 has a unique set of recognition parameters or recognition algorithms, preferably including different modeling parameters, for processing audio signals corresponding to spoken utterances originating at speaking locations with differing acoustic characteristics and/or microphone placement.

The microphone 41 and controls 43 interface are coupled to the main processor 48 for receiving audio signals via the microphones 42 and control signals from the PTT controls 46. The user interface 54 also provides for sending display and audio signals to the user. The main processor 48, the selector application 56 and the operating system 60 form a speech engine selector 76. The selector 76 receives and processes (using the main processor 48) PTT control signals according to selection algorithms of the selection application 56 for routing the corresponding audio signals to the appropriate speech engine 74. Preferably, the microphones 42 and PTT controls 44 are directly coupled to the selector 76 via the user interface 54.

Each speech engine 74 includes or may access in the VCS memory 72 one or more command and control grammar (CCG) sets. The CCG sets contain the list of known car-related voice commands for controlling vehicle accessory functions. Thus, for example, the CCG sets can include commands executable by the navigation unit for accessing various navigation menus pertaining to map guidance, destination entry, display commands and navigation set-up. Additionally, the commands can activate pre-recorded speech files or synthesized voice messages processed according to text-to-speech algorithms for outputting to a vehicle audio system 77 audible feedback to occupants about the functions or states of the accessories being controlled.

One or more of multiple CCG sets containing different sets of commands can be made active so that different accessories or accessory functions can be voice activated by various vehicle occupants. For example, a driver CCG set can be made active which has a "rear view mirror adjust" command allowing the driver to adjust the rear view mirrors, while an active passenger CCG set may not contain such a command.

Any of a number of different types of CCG set structures known in the art may be used. For example, the voice commands may include key terms, which identify a parameter for adjustment, such as temperature, volume, speed, and window and seat position. Alternatively, the voice commands may be organized in a menu system such that the voice commands are in terms of the accessory to be controlled followed by a function parameter. An example of this distinction is in a key word driven system, an exemplary voice command for lowering a window is, "lower window", while a corresponding voice command in a menu driven system is "window-down". The present invention can be utilized to organize and recognize voice commands in either, both or other known voice command structures.

One embodiment of a speech engine architecture usable with the present invention will be described. Generally, the speech engine employs voice recognition techniques to recognize spoken sounds and transmit corresponding commands to controls for voice activated vehicle accessories, such as accessories 64, 65, 66. The speech processor 70 receives digitized audio signals from the microphones 42. Under the control of a speech engine 74, the speech processor 70 analyzes the digitized speech signals using speech engine recognition algorithms to identify a corresponding voice command contained in the active grammar set.

Figure 4:
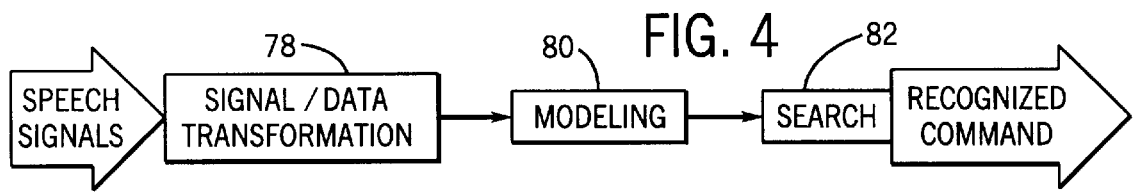
FIG. 4 is a block diagram of a speech engine architecture for use in the speech recognition system of FIG. 3.

More specifically, referring to FIG. 4, at signal/data transformation block 78, the speech processor 70 uses the recognition algorithms to convert the digitized speech signals into an alternate form such as one indicating spectral characteristics. The signal/data transformation block 78 produces a new representation of the speech signals that can then be used in subsequent stages of the voice recognition process. In modeling block 80, modeling algorithms are used to process the speech signals further by applying speaker-independent acoustic models, as well as other known lexical and language models, to the signals. Finally, in search block 82, search algorithms are used to guide the speech processor 70 to the most likely command corresponding to the speech signals. The search algorithms can identify a single best matching command or a set of N-best matching commands of a CCG set. Using this N-best technique, a set of the most likely commands is created, each preferably being assigned a match probability weighting. Referring again to FIG. 3, once the matching command is identified, it is sent via the I/O module 52 and the control interface 56, to the relevant accessory to perform the desired task.

Figure 5:
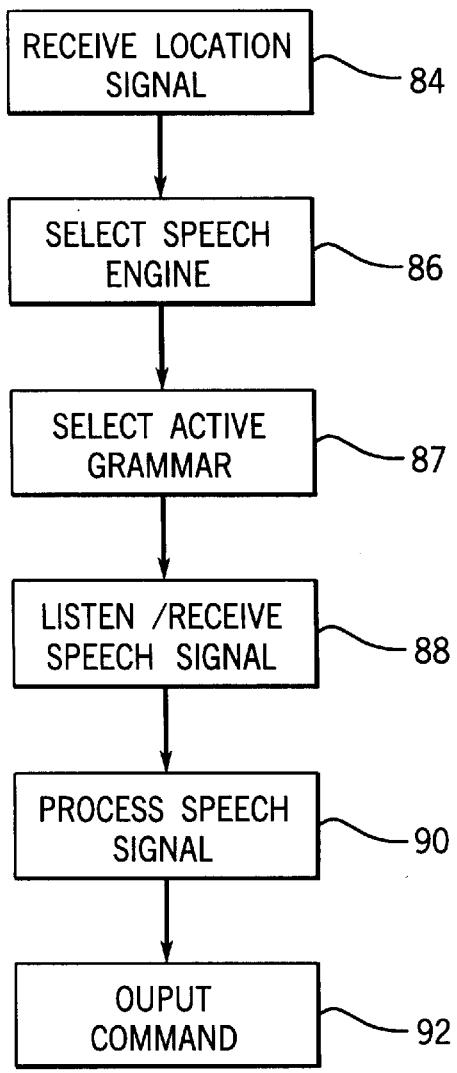
FIG. 5 is a flow diagram of a preferred method of using the speech recognition system of FIG. 3.

FIG. 5 illustrates a preferred method of operating the in-vehicle speech recognition system of the present invention. The process begins by a driver or passenger initiating a control action by depressing the PTT control 44 corresponding to his or her seat location and uttering a speech command. For example, to control a voice activated climate control system, the driver could depress the steering wheel mounted PTT control 42 and say, "temperature up".

In step 84, once a driver/passenger depresses a PTT control 44, the selector 76 receives a PTT control signal. At step 86, preferably, each PTT control 44 can produce a unique location signal so that the selector can distinguish the control signals into a single I/0 address. The main processor 48 of the selector 76 then processes the location signal using the selection application 56 to determine which speech engine recognition algorithms should be used to process the audio signals from the corresponding microphone 42. Additionally, at step 87, the processor 48 preferably also processes the location signal to select the appropriate CCG set to be used. Alternately, each PTT control may occupy a separate address of the I/O module 52 so that the audio signal corresponding to each PTT control signal is routed to the appropriate speech engine 74 without processing a location signal.

The selector 76 then relays a PTT selection signal to the selected speech engine 74, containing the active CCG set selection if appropriate. At step 88, receipt of the selection signal initiates a listening mode within the speech processor 70 at which point the speech processor 70 receives the audio signals from the corresponding microphone 42. At step 90, the speech processor 70 processes the digitized signals, as described above, using the recognition algorithms of the selected speech engine to identify a matching voice command in the-selected active grammar. At step 92, the speech processor 70 then outputs the matched voice command to the relevant accessory via the I/O module 52 and the control interface 56 to perform the desired task.

In this way, the speech recognition system of the present invention can accurately recognize voice commands from automobile occupants seated at various cabin locations by providing multiple speech engines programmed to recognize speech signals originating from locations having different acoustical qualities. Moreover, the speech recognition system can control what accessories and accessory functions can be operated at each location.

The present invention may include other aspects not specifically delineated in the aforementioned preferred embodiments. For example, the speech engines 74 can include algorithms to further improve speech recognition accuracy by using prior spoken phases and phonetic patterns to modify the acoustic and language models. In this way, the speech engines can effectively be adapted to the voice characteristics of a speaker as well as the acoustic affects of the various speaking locations.

Additionally, although the microphones and PTT controls are shown and described as being directly coupled to the user interface, they may also be connected via the network bus as are the accessories. Also, the selector 76 may have a dedicated selection processor and/or memory contained in a selector module.

Moreover, although the above describes a software-base speech engine selecting technique, alternatively the present invention could include a discreet selector device separately hardwired to each of the microphones and PTT controls. Further, the selector device could be separately hardwired to multiple voice control modules each corresponding to a separate speaking location and having a dedicated speech processor, speech engine and CCG set.

It should be understood that the present invention functionally requires two or more speech engines. Thus, the present invention can be practiced using multiple stand-alone software applications having separate program files and recognition algorithms providing multiple speech engines operating independently of each other. However, the present invention can also be practiced using a single software application having one set of program files operating to perform variously configured recognition algorithm and/or grammar sets. In this case, the single application provides multiple speech engines sharing common program files.

Thus, the above in no way is intended to limit the scope of the invention.

Accordingly, in order to apprise the public of the full scope of the present invention, reference must be made to the following claims.

What is claimed is:

1. A speech recognition system in an automobile having at least one voice activated accessory and a passenger cabin having seats defining a plurality of speaking locations, comprising:

a plurality of push-to-talk controls mounted within said passenger cabin so as to correspond to said plurality of speaking locations, each of said plurality of push-to-talk controls supplying a location signal when operated;

a plurality of microphones mounted within said passenger cabin so as to correspond to said plurality of speaking locations, each of said plurality of microphones being capable of receiving a spoken utterance from a speaker at said plurality of speaking locations and providing a corresponding audio signal;

a plurality of speech engines, each having different recognition parameters, for recognizing said audio signal as a speech command for controlling said at least one voice activated accessory; and a selector coupled to said plurality of push-to-talk controls, microphones and speech engines, said selector selecting one of said plurality of speech engines according to said location signal and providing said audio signal to said selected speech engine.

2. The system of claim 1, wherein said selector is coupled to said plurality of push-to-talk controls via a vehicle network and wherein said selector processes said location signal to determine said selected one of said plurality of speech engines.

3. The system of claim 1, wherein said selector has separate inputs for each of said plurality of push-to-talk controls and wherein said inputs are coupled to a particular one of said plurality of speech engines.

4. The system of claim 1, wherein said selector provides a selection signal to said selected speech engine corresponding to said location signal.

5. The system of claim 4, wherein at least one of said plurality of speech engines contains a plurality of grammar sets each containing different sets of voice commands.

6. The system of claim 5, wherein said selector selects an active grammar according to said location signal.

7. The system of claim 6, wherein said selection signal indicates said selected active grammar set.

8. The system of claim 1, wherein said speech recognition characteristics are set according to acoustic modeling parameters.

9. The system of claim 8, wherein each of said plurality of speech processors have different acoustic modeling parameters for processing audio signals corresponding to spoken utterances originating at speaking locations having at least one of different acoustic characteristics and microphone placement.

10. The system of claim 1, wherein said selector and said plurality of speech engines are included in a central control unit.

11. The system of claim 10, wherein said voice central control unit includes a memory for storing voice commands.

12. The system of claim 1, wherein said selected speech engine provides a speech command to a controller for said at least one voice activated accessory.

13. In an automobile having a passenger cabin with a plurality of speaking locations and a speech recognition system with multiple speech engines for controlling at least one voice activated accessory, a method for operating said at least one voice activated accessory via a spoken utterance issue by a speaker at one of said plurality of speaking locations, comprising the steps of:

receiving a location signal from one of a plurality of push-to-talk controls mounted within said passenger cabin and operated by said speaker at said one of said plurality of speaking locations;

selecting, according to said location signal, one of said multiple speech engines having different recognition parameters and having speech commands for operating said at least one voice activated accessory;

supplying said selected speech processor an audio signal corresponding to said spoken utterance received by one of a plurality of microphones mounted within said passenger cabin and corresponding to said plurality of speaking locations;

processing said spoken utterance to identify a corresponding speech command; and outputting said corresponding speech command to a control for said at least one voice activated accessory.

14. The method of claim 13, further comprising the step of supplying a selection signal corresponding to said location signal to said selected speech engine.

15. The system of claim 14, wherein at least one of said multiple speech engines contains a plurality of grammar sets each containing different sets of voice commands.

16. The system of claim 15, further comprising the step of selecting an active grammar set according to said location signal.

17. The system of claim 16, wherein said selection signal indicates said selected active grammar set.

18. The method of claim 13, wherein said speech recognition characteristics are set according to acoustic modeling parameters.

19. The system of claim 18, wherein each of said multiple speech engines have different acoustic modeling parameters for processing audio signals corresponding to spoken utterances originating at speaking locations having at least one of different acoustic characteristics and microphone placement.

* * * * *

UNITED STATES PATENT AND TRADEMARK OFFICE
CERTIFICATE OF CORRECTION

PATENT NO. : 6,230,138 B1  
DATED : May 8, 2001  
INVENTOR(S) : Charles Allen Everhart It is certified that error appears in the above-identified patent and that said Letters Patent is hereby corrected as shown below:

Column 1,  
Line 36, add -- to -- before "each";  
Line 37, change "accommodate" to -- provide accommodations --;

Column 3,  
Line 5, before "three", delete "a"; and

Column 7,  
Line 30, before "central", delete "voice".

Signed and Sealed this

Thirtieth Day of July, 2002

Attest:

Attesting Officer

JAMES E. ROGAN  
Director of the United States Patent and Trademark Office